United States Patent [19]

Erikson

[11] 4,186,308

[45] Jan. 29, 1980

[54] LARGE FORMAT PHOTOGRAPHIC FILM CASSETTE

[75] Inventor: Herman E. Erikson, Winchester, Mass.

[73] Assignee: Polaroid Corporation, Cambridge, Mass.

[21] Appl. No.: 841,889

[22] Filed: Oct. 13, 1977

[51] Int. Cl.² .................... G03B 17/26; G03B 41/18
[52] U.S. Cl. ................................... 250/480; 354/276
[58] Field of Search ............... 354/276; 250/475, 480; 206/455

[56] References Cited

U.S. PATENT DOCUMENTS

| | | | |
|---|---|---|---|
| 2,709,223 | 5/1955 | Bachelder et al. | 250/480 |
| 3,103,864 | 9/1963 | Erikson et al. | 250/468 |
| 3,330,953 | 7/1967 | Erikson | 250/477 |
| 3,733,679 | 5/1973 | Bruneau | 29/431 |
| 3,748,983 | 7/1973 | Gold | 354/275 |
| 3,784,835 | 1/1974 | Schmidt | 250/480 |
| 3,870,889 | 3/1975 | Schmidt | 250/480 |
| 4,019,194 | 4/1977 | Cutler et al. | 354/312 |

Primary Examiner—John Gonzales
Attorney, Agent, or Firm—Edward S. Roman

[57] ABSTRACT

A cassette that holds a large format photographic film unit of the self-developing type in a film plane for exposure to x-rays has a generally rectangular housing and a pressure plate disposed in the housing. The walls of the housing are in fixed relation to one another. A variable gap film-loading opening is defined at one transverse end of the housing and a second variable gap opening is provided at the opposite end for sliding removal of an opaque envelope surrounding the film unit. Springs resiliently urge the pressure plate into intimate, continuous contact with the film unit which also places the photosensitive layer of the film unit in intimate, continuous contact with an x-ray sensitive phosphor layer disposed adjacent the film plane. Operating members such as spring-loaded slide rods mounted in the longitudinal edges of the cassette are operatively connected to the pressure plate through one or more cam surfaces. Movement of the operating members in a direction parallel to the film plane is translated into a transverse movement of the pressure plate away from the film unit. This movement of the pressure plate releases the film unit and increases the housing openings to allow the sliding insertion and removal of the film unit and the sliding removal of the envelope. Light seals are preferably provided at the openings to ensure that the cassette is light tight when the film unit is loaded in the cassette for exposure.

8 Claims, 12 Drawing Figures

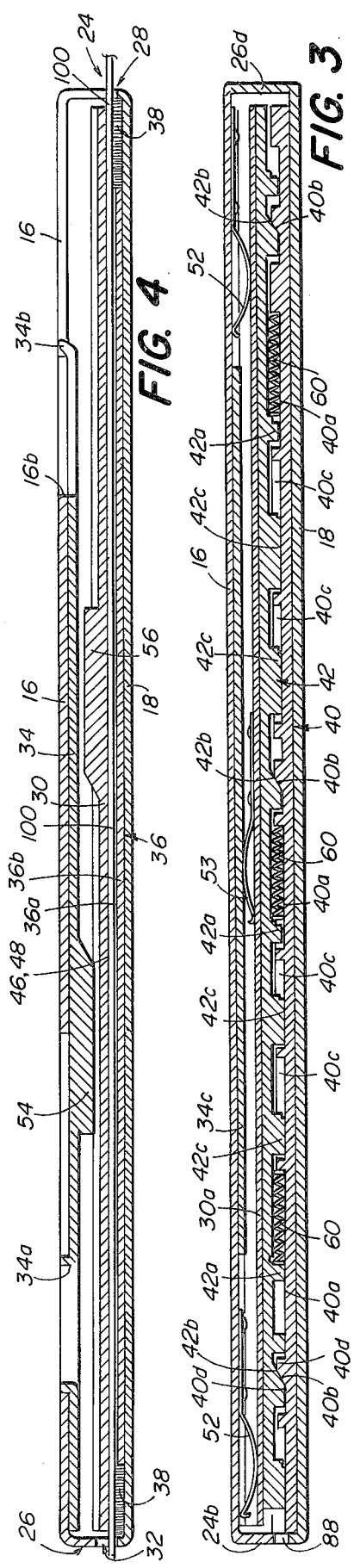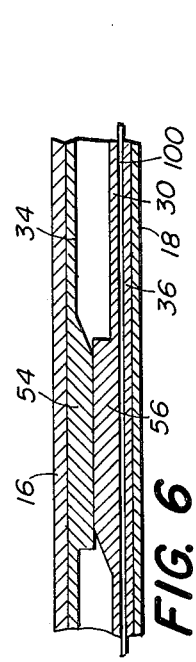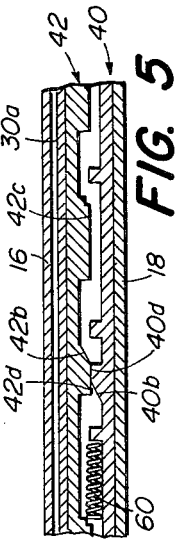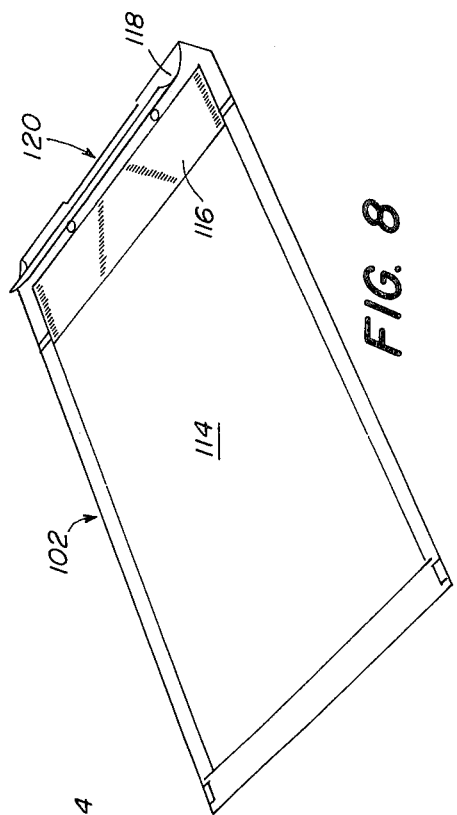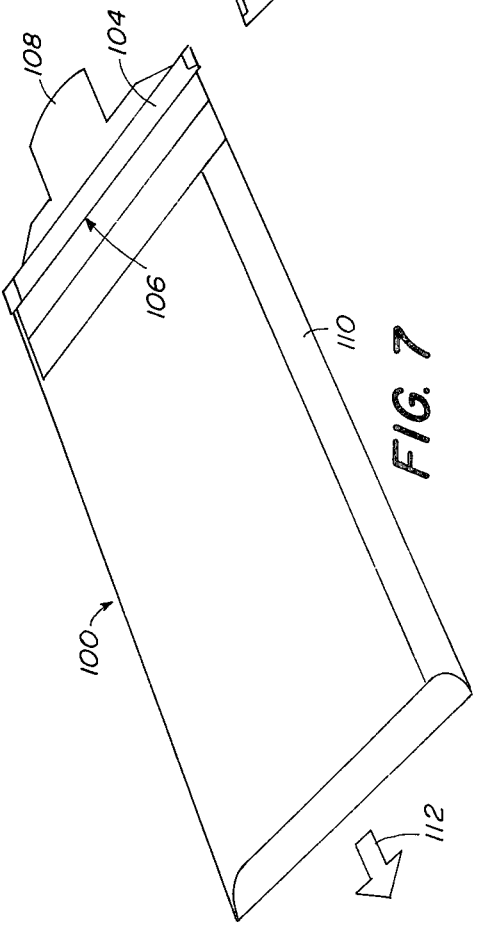

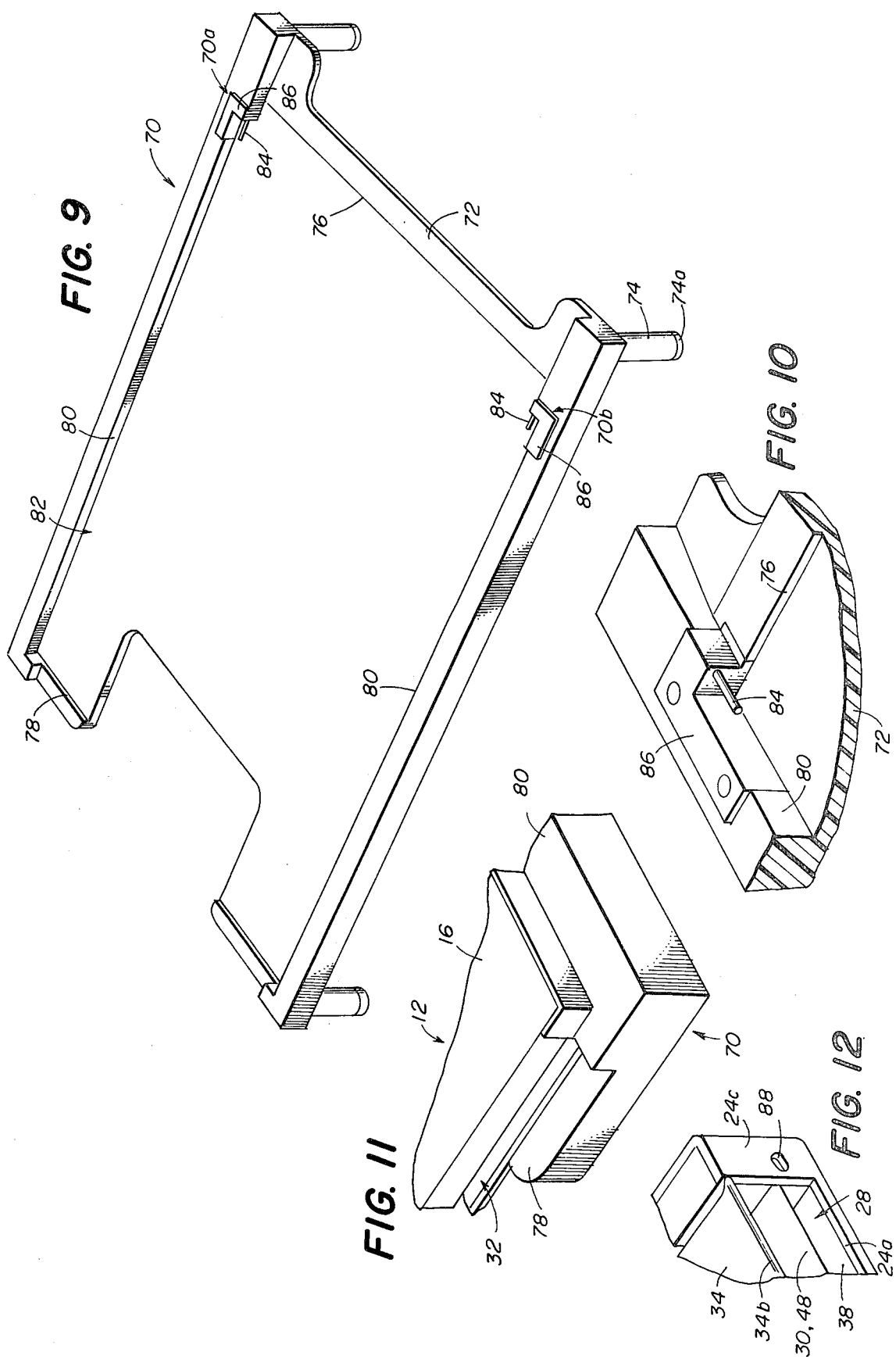

LARGE FORMAT PHOTOGRAPHIC FILM CASSETTE

BACKGROUND OF THE INVENTION

This invention relates in general to holders or cassettes for film. More specifically it relates to a cassette that holds large format film units of the self-developing type for exposure to x-rays.

In large format radiography (e.g. 8×10 or 10×12) it is standard practice to load the film into a holder or cassette. The cassette, which is typically light tight when loaded with film, facilitates storage, handling and processing of the film.

Cassettes have proven to be particularly useful in radiography using self-developing film. In medical applications, for example, self-developing radiographs are useful in delicate operations where the progress of a catheter through blood vessels must be repeatedly monitored. Daylight pre-loading of the cassette with the film, handling convenience, and relatively short time periods to prepare the cassette for exposure and processing are all highly desirable qualities. For x-ray applications, the cassette preferably includes a rigid screen or other surface that has a layer of phosphors that emit visible light when exposed to x-rays. The photosensitive layer of the film is held in close and continuous contact with the phosphor layer so that the x-ray induced light of the phosphors intensifies the image to be recorded on the film.

Cassettes heretofore known in the art, for example, U.S. Pat. Nos. 2,709,223 to Bachelder et al and 3,103,864 to the present applicant, are characterized by housings that are hinged to open in the manner of a book. The film is loaded in the opened cassette and an intensifying screen is placed opposite the photosensitive layer of the film, preferably by pivoting the screen about one edge. The cassette is then closed and latched to render it light-tight.

Both of these cassettes also utilize a spring-biased, plate-like portion of the housing to grip the film unit. This gripping action secures the film in a predetermined position and places its photosensitive layer in a flat configuration coincident with a film plane. In radiography, this action also places the photosensitive layer in continuous, intimate contact with the phosphor layer. These cassettes also have manually operated cam levers that draw the movable housing plate away from the film against the spring force. The cam action allows the sliding removal of an opaque envelope that shields the photosensitive layer from ambient light before and during the loading operation. After exposure, the cam action allows the film unit to be withdrawn from the cassettes through an end opening for processing. It should be noted that these cassettes are designed for use with a film unit that includes both a "negative" photosensitive layer and a "positive" image receiving layer, together with suitable support layers and a rupturable pod of processing fluid as described in the aforementioned patents.

While these cassettes function adequately, they suffer from various disadvantages. First, they are relatively inconvenient to use. Film loading requires opening the cassette and manually positioning the film in the cassette with an interposed intensifying screen. With the Erikson '864 cassette, for example, one housing member must be pivoted twice through 360° and latched each time. Second, because the cassettes are fully opened to load the film, the intensifying screen and other surfaces are subject to contamination by fingerprints or dust. Also, the negative is more susceptible to fogging by exposure to the afterglow of certain phosphors. Third, the relatively heavy springs utilized in these cassettes can cause a highly undesirable outward bowing of the housing. This situation is particularly characteristic of the earlier Bachelder cassette where the central bowing of the housing plate under the springs can be as much as one-eighth inch. Another problem of the Bachelder cassette is that it is comparatively heavy.

A more recent cassette manufactured by the Polaroid Corporation is similar to the Erikson '864 x-ray cassette, but with modifications for conventional photography using a photosensitive or "negative" film unit sold by Polaroid Corporation under the trade designation "Type 808, 8×10 Land Film." This cassette also opens to load the film unit. A plastic tab engages a flap on the film unit to register the film. The cassette is closed, and removal of an opaque envelope and a dark slide mounted in the cassette present the film for exposure. After exposure, the dark slide is reinserted and a positive, image receiving film unit is inserted into the cassette in superposed relationship with the negative. These mated film elements are then pulled together through a pair of processing rolls.

While the cassette is suitable for use with modern self-developing film where the negative and positive elements are not physically linked together, it suffers from disadvantages of the earlier cassettes in that it must be opened for loading. In addition, since there is no system for relieving the pressure on the various sliding surfaces, the friction accompanying the removal and insertion of the dark slide can move the camera or shift the film within the cassette. Another disadvantage is that the high friction associated with the sliding insertion of the positive film unit introduces a significant time delay between exposure and processing.

U.S. Pat. No. 3,330,953, also to the present applicant, describes another x-ray cassette adapted for analysis of crystals by back reflection laue exposure. In this cassette the film is inserted through an end opening of the cassette so that the intensifying screen is not exposed to contaminants and light. Also, the cassette has a slide member with cam surfaces that control the grip and release of the film unit. This cassette, however, differs markedly from the aforementioned construction since it is adapted for use with film of much smaller format, typically 4×5. In particular, the pressure applying arrangement to place the crystal, film and screen in intimate contact employs a thin, flexible light barrier that extends across a large exposure window formed in the housing.

It is therefore a principal object of this invention to provide a cassette for large format, self-developing film units that is highly convenient to use and does not expose internal components to contaminants during loading.

Another object of the invention is to provide a cassette that allows speedy, uncomplicated daylight loading with a minimum likelihood of fogging.

Yet another object of this invention is to provide a cassette with the foregoing advantages that provides automatic and optional manual release of a pressure applying member that holds the film unit in a precisely predetermined flat configuration against an intensifying screen suitable for radiography.

Still another object is to provide a cassette that is lightweight, accommodates modern self-developing film and yields good quality prints.

SUMMARY OF THE INVENTION

A cassette releasably holds a large format film unit with its photosensitive layer accurately positioned in a film plane. A housing formed of a rigid structural material transparent to x-rays has a pair of opposed faces in fixed, spaced relationship that are also generally coextensive with the photosensitive area of the film unit. A pressure applying member is disposed within the housing generally parallel to the film plane and movable between first and second positions in a direction generally transverse to the film plane. Operating members and cams responsive to the operating members selectively place the pressure member in either position. Springs or the like urge the pressure member to the first position where it is in intimate, continuous contact with the film unit which in turn is in continuous, intimate contact with an exposure intensifying layer of x-ray sensitive phosphors.

The housing has a film loading and unloading opening formed in one transverse end which, in cooperation with the pressure member, defines a film-receiving gap whose height is variable with the movement of the pressure member. The housing preferably has a second variable gap opening in the opposite end and which allows the sliding removal of an opaque envelope enclosing the photosensitive film layer. The housing and pressure member are structured to define a light-tight exposure compartment for the film unit when it is loaded in the cassette. Preferably the cassette has additional light seal means such as strips of light blocking materials affixed to the housing at the openings.

In a preferred form the pressure member is automatically controlled by a pair of spring-biased slide rods mounted for longitudinal movement in the longitudinal edges of the housing. Actuating pins, preferably mounted on a separate loading tray, engage one end of each slide rod through access holes formed in the housing. Cam surfaces formed on the slide rods are operatively connected to the periphery of the pressure member to place the pressure member in the second position when the actuating pins are fully engaged. Also in a preferred form, a manually operated sliding member mounted on one housing face carries a cam surface that interacts with the pressure member at its center.

Also in a preferred form, a tab is flexibly mounted at the load-unload opening to engage a pocket formed on the film unit and thereby automatically register the film unit within the cassette. The tab also restrains movement of the film unit as the envelope is withdrawn. In addition, the slide cover is preferably structured so that when it is positioned to place the pressure member in the first film engaging position, it can catch and secure a folded-over end of the film unit that would otherwise project from the load-unload opening.

These and other objects and features of the invention will be more fully understood from the following detailed description of the preferred embodiments which should be read in light of the accompanying drawings.

BRIEF DESCRIPTION OF THE DRAWINGS

FIG. 3 is a view of the cassette in longitudinal section taken along the line 3—3 in FIG. 1;

FIG. 4 is a view of the cassette in longitudinal section taken along the line 4—4 of FIG. 1;

FIG. 5 is a view corresponding to FIG. 3 with portions broken away showing the slide rods and pressure plate in a film-release position;

FIG. 6 is a view corresponding to FIG. 4 with portions broken away showing the slide cover and pressure plate in a film-gripping position;

FIG. 7 is a perspective view of a negative film unit including an opaque light shielding envelope suitable for use in the cassette shown in FIGS. 1-6;

FIG. 8 is a perspective view of a positive film element including a rupturable pod of processing fluid suitable for use in conjunction with the processing of the negative film element shown in FIG. 7;

FIG. 9 is a perspective view of the loading fixture shown in FIG. 2;

FIG. 10 is a detailed perspective view of an actuating pin mounted in the loading fixture;

FIG. 11 is a detailed perspective view of a rear corner of the cassette seated in the loading fixture as shown in FIG. 2; and FIG. 12 is a detailed perspective view of a front corner of the cassette of FIGS. 1-6 showing a portion of a film load-unload opening and an actuating pin access opening.

DETAILED DESCRIPTION OF THE PREFERRED EMBODIMENTS

Figure 1:
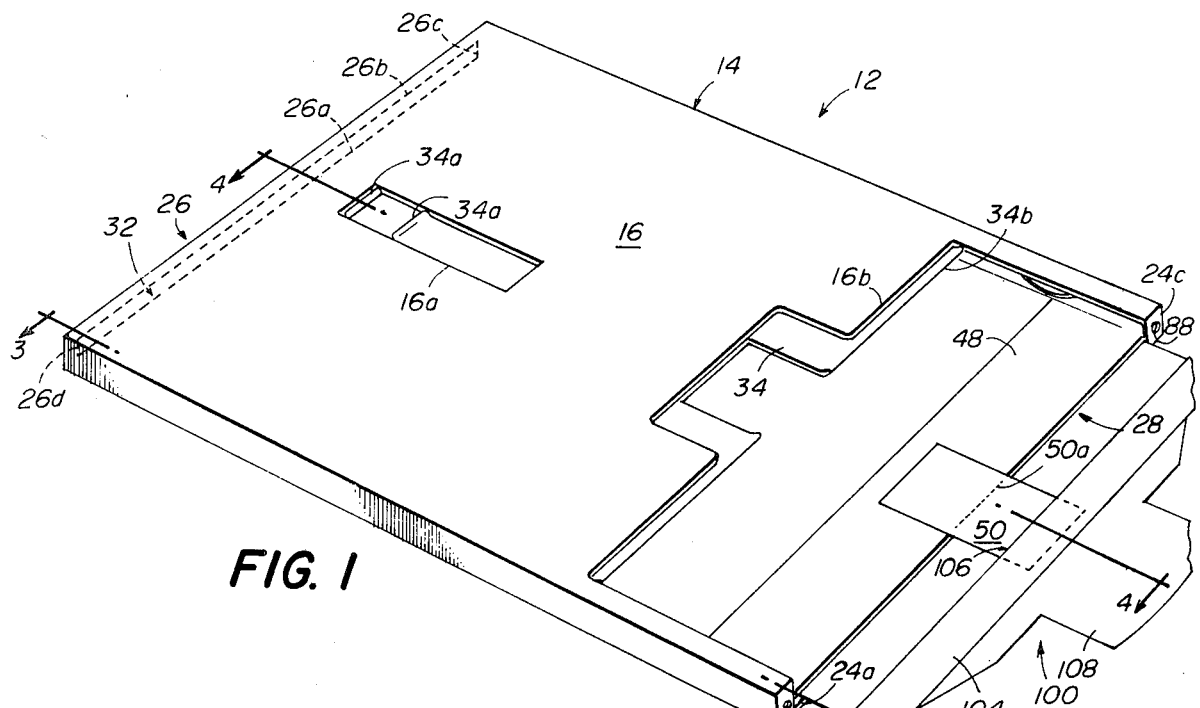
FIG. 1 is a perspective view of a cassette constructed according to the invention.

With reference to FIGS. 1-4, a cassette 12 suitable for releasably holding large format photographic film for exposure to actinic radiation, and in particular x-rays, has a generally rectangular, hollow housing 14 formed of a rigid structural sheet material that is opaque to visible light but substantially transparent to x-rays. Suitable materials include aluminum, magnesium and bakelite. The housing 14 has an "upper" face 16 and a substantially parallel spaced apart "lower" face 18, longitudinal side walls 20 and 22 and transverse "front" and "rear" walls 24 and 26, respectively. (It will be understood that the designations "upper", "lower", "front" and "rear" are convenient descriptive terms of the cassette as illustrated, but that the invention is not limited to any particular spatial orientation.) The front wall 24 extends upwardly from the lower face 18 a short distance to an edge 24a that defines in part a film loading and unloading opening 28. The lateral front wall portions 24b and 24c and pressure plate 30, mounted within the housing, also define the opening 28. A similar opening 32 in the rear wall is defined by the edges 26a, 26b, 26c and 26d and the pressure plate.

The upper face 16 is formed from a continuous piece of sheet material. It also has angled longitudinal side walls which are in abutting, face-to-face relationship with the side walls integral with the lower face. Screws (not shown) threaded in these side walls secure the upper and lower faces to one another.

A cover slide 34 is slidably mounted between the face 16 and the pressure plate 30. The window 16a in the face 16 provides access to an operating handle 34a formed on the slide cover and limits the longitudinal movement of the handle and the cover. When the slide is in a forward limit position (FIG. 12), its upturned forward edge 34b is adjacent the forward wall 24. In its rear limit position, the forward edge 34b is adjacent a recessed forward edge 16b of the upper face.

Figure 2:
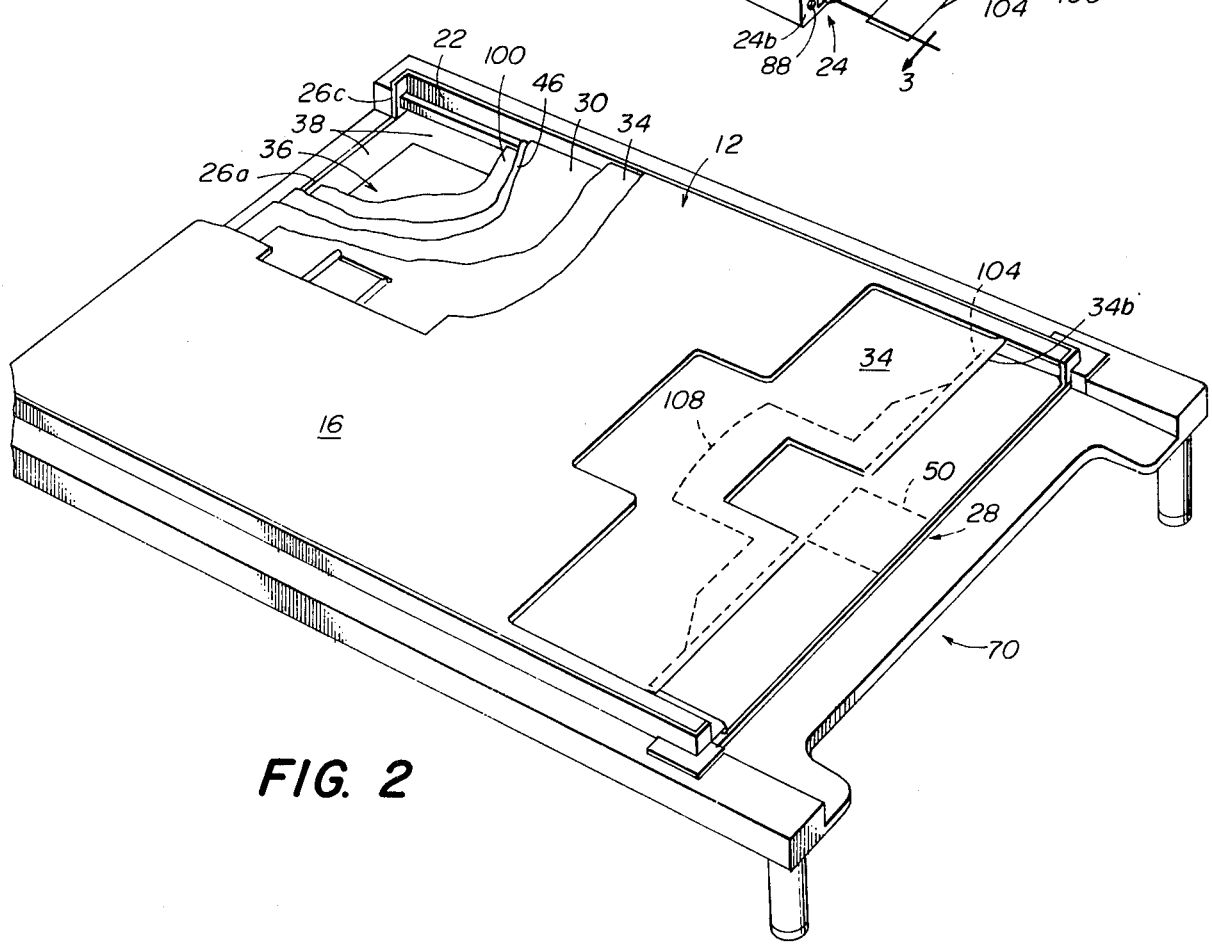
FIG. 2 is a perspective view with portions broken away of the cassette shown in FIG. 1 mounted in a film loading fixture according to this invention.

With particular reference to FIGS. 2 and 4, an intensifying screen 36 is secured to the interior surface of the lower face 18. The screen 36 has a layer 36a of phosphors that emit visible light when struck by x-rays. The phosphor layer is deposited on a support sheet 36b that is adhesively bonded to the face 18. The thickness of the screen 36 is selected so that the phosphor layer is immediately adjacent a film plane which in turn is substantially coincident with the focal plane of the x-ray imaging system. The lateral dimensions of the screen are selected to be generally co-extensive with those of a photosensitive layer of a film unit 100 (FIG. 7).

Strips 38 of a conventional light-seal material such as black felt or the pile fabric sold under the trade designation "Vertipile" surround the intensifying screen 36. These light seal strips engage the loaded film unit 100 around its photosensitive layer to block ambient light. The strips are also adhesively secured to the lower face 18. The longitudinally extending strips 38 each have their outer edges angled up and adhesively bonded to a side of a longitudinally extending cam rod 40 fixed to the lower face 18. This upturned edge portion blocks ambient light that may bypass the pressure plate 30. The fixed cam rods 40 and associated slide rods 42 support the pressure plate 30.

The pressure plate 30 is formed of a structural sheet material, preferably aluminum, and is generally co-extensive with the housing faces 16 and 18. The longitudinal edges 30a of the plate 30 are structured to rest on the upper surface of the slide rods 42. A resilient pad 46 is adhered to the lower, film-facing surface of the pressure plate. It is covered by an overlying sheet of a highly smooth, flexible and preferably black plastic sheet 48. The sheet material is folded over the transverse ends of the pressure plate and adhesively secured to the upper surface of the pressure plate. The pad 46 and plastic cover 48 promote an intimate, continuous, and generally uniform contact between the pressure plate and the loaded film unit 100 while reducing the sliding friction generated upon inserting or removing the film unit. Also, a plastic tab 50 is secured at the forward edge of the pressure plate. The tab 50 is readily bent through 180 degrees about a line 50a parallel to the forward edge of the pressure plate.

A set of leaf springs 52 secured to the upper face panel 16 along its longitudinal edges are positioned to bear on the longitudinal edges 30a of the pressure plate. A pair of similar springs 53 are secured to the upper surface of the edges 30a approximately midway between the front and rear edges of the pressure plate. The springs 53 bear against lateral projections 34c of the side cover. The springs 52 and 53 together urge the pressure plate downwardly toward the intensifying screen and an interposed loaded film unit 100 as shown in FIGS. 3 and 6. In this position, the photosensitive layer of the film unit is placed in intimate, continuous contact with the intensifying screen. Additionally, the film is secured in an accurately predetermined, flat configuration with the photosensitive layer substantially coincident with the film plane.

It should be noted that the spring force is applied at the longitudinal edges of the film unit. While the inherent rigidity of the pressure plate and the resilient layer 46 will transmit this force over the entire film, it is desirable to apply a supplemental pressure to a central region of the pressure plate. To this end, a mating, opposed pair of cam blocks 54 and 56 are secured at the middle of facing surfaces of the slide cover 34 and the pressure plate 30, respectively. When the slide cover is in its rear, film-loading position, the cam blocks are longitudinally spaced from one another (FIG. 4). When the slide cover is in its forward film-loaded position, the cam blocks are engaged (FIG. 6). The thickness of the cam blocks is selected so that when they are so engaged, they displace the pressure plate downwardly toward a film-gripping position.

As best seen in FIGS. 3 and 5, each cam rod 40 has three longitudinally spaced recesses 40a which each hold a spring 60 that is spaced from the forward end of the recess and abuts the opposite end. Each cam rod 40 also has three axially spaced, inclined cam surfaces 40b, and a series of longitudinally extending guide slots 40c. Each slide rod 42 has formed on its lower surface projections 42a that interact with the springs 60, cam surfaces 42b adapted to engage the cam surfaces 40b, and guide projections 42c that each engage the slots 40c. The springs 60 urge each slide rod toward the forward end of the cassette as shown in FIG. 3. In this position, the cam surfaces 40b and 42b are disengaged from one another and the slide rods are in a "lowered" position. The pressure plate 30 supported on the slide rods 42 is likewise in its "lower" film-gripping position. In contrast, when the slide rods 42 are moved longitudinally against the springs 60 toward the rear of the cassette 12, the opposed cam surfaces 40b and 42b ride up one another until the flat upper surface 40d and 42d adjoining the inclined cam surfaces are in overlapping relation (FIG. 5). This cam action displaces the slide rods vertically, which moves the pressure plate upwardly away from the film unit and the intensifying screen to an upper limit position. In this upper position, there is sufficient spacing between the pressure plate and the intensifying screen that the film unit slides longitudinally within the cassette with a low level of frictional restraint. By way of illustration but not of limitation, in a preferred embodiment a longitudinal movement of the slide rods over one-quarter inch generates a transverse vertical displacement in the range of sixty to ninety thousandths of an inch.

FIGS. 7 and 8 illustrate the "negative" film unit 100 having a photosensitive layer and a "positive" film unit 102 having an image receiving layer. These film elements are of the self-developing type and preferably are similar in format and construction to the color film marketed by the Polaroid Corporation under the trade designation Type 808 Land Film. The negative film unit includes a leader 104 with a rear-facing pocket-like opening 106, a forwardly projecting tab 108 that is secured to the leader, and an opaque envelope 110 that is sealed on three sides and surrounds the photosensitive layer of the film unit to prevent its exposure to ambient light. The envelope 110 is slidably removable from the film unit in the direction indicated by arrow 112 to present the photosensitive layer for exposure.

The positive film element 102 has an image-receiving layer 114, a rupturable pod 116 that contains a processing fluid and a leader 118. A transverse slot 120 formed in the leader is adapted to receive the negative tab 108 to align the film element 100 and 102 with their photosensitive and image receiving layers in superposed relation.

As is evident from the foregoing description, the pressure plate 30 is normally in a lowered, film-gripping position. To load the cassette, it is necessary to move the pressure plate against the springs 52 and 53 to its raised position. For this purpose, this invention includes a loading fixture 70 as shown in FIGS. 2, 9, 10 and 11. The fixture has a base 72 supported on legs 74 with non-skid rubber tips 74a that restrain movement of the fixture as the cassette 20 is inserted into the fixture. A front wall 76, a rear wall 78 and side walls 80 define a rectangular cassette-receiving recess 82. A pair of actuating pins 84 are mounted at the front corners 70a and 70b of the fixture in mounting blocks 86. Each pin 84 projects toward the cassette 12 when it is seated in the recess 82 (as shown in FIG. 2) to enter the cassette housing through a small opening 88 in the front wall 24. The pins are sufficiently long that when the cassette is fully seated in the fixture 70 the pins 82 engage the front ends of the slide rods and drive them against the force of the springs 60 to the rear limit positions. Since this longitudinal movement cams the slide rods upwardly, the cassette pressure plate is automatically placed in the film-load position. The rear wall of the cassette engages the rear lip of the fixture (FIG. 11) to secure the pressure plate in the film load position. Since the pressure plate 30 defines one edge of the housing openings 28 and 32, this vertical movement varies the height or grip of these openings.

To load the cassette, the film unit 100 is slid into the opening 28 with its leader end trailing. The presence of the film unit in the opening renders it light-tight. The tab 50 secured to the pressure plate enters the pocket 106 in the film unit leader to automatically position the film unit within the cassette with its photosensitive layer over the intensifying screen. At this point, the film unit fills the rear opening 32 to render it light tight and the presence of the film unit in the opening 28 likewise renders it light-tight. The film unit projects from both openings (FIG. 4).

Next the envelope 110 is removed from the cassette by pulling it through the opening 32. Tab 50 engaged in the pocket 106 prevents the rest of the film unit 100 from also being drawn through the opening 32. This leaves the photosensitive layer of the film opposite the phosphor layer of the intensifying screen.

To secure the leading end of the film unit and prevent it from becoming damaged, the tabs 50 and 108, leader 104, and adjoining portions of the film unit are folded over the pressure plate into the front "cut-out" region of the housing upper face 16 defined by the front edge 16b. The slide cover 34 is then drawn forward to catch the folded over portion of the film unit under the slide cover (FIG. 2). The upturned leading edge of the slide cover facilitates this catching movement.

The cassette is then disengaged from the loading fixture by lifting its rear end out of the abutting relationship with the rear fixture wall 78. The spring forces in the cassette then automatically place the pressure plate in its normal film gripping position (FIG. 3). The cassette is then loaded and ready for storage or exposure.

With the cassette described above, it is possible for even someone with little or no experience in handling large format film to quickly, conveniently and reliably load such film into a cassette. There is no opportunity for fingerprints, dust or any significant amount of light to reach the photosensitive film layers or the intensifying screen. Moreover, much of the loading operation is automatic. Placing the cassette in the loading fixture automatically raises the pressure plate to present a low sliding friction to the film unit. The tab 50 automatically aligns the film unit. Removal of the cassette from the loading fixture automatically grips the film and places it in intimate contact with the intensifying screen. Catching the loose end of the loaded film under the slide cover simultaneously applies a central pressure on the pressure plate.

While this invention has been described with reference to an x-ray cassette that is permanently sealed to ambient light except at selected end openings, it is within the scope of this invention to use such a cassette for conventional large format photography where it is important to maintain the film in a planar configuration. For this purpose, the intensifying screen 32 is omitted and a relatively large exposure window is formed in the housing between the film and the object space being photographed. A conventional dark slide can render the exposure window light tight during loading and storage so that the construction and operation of the cassette are essentially the same as described above with reference to the x-ray embodiment of this invention.

While this invention has been described with reference to a self-developing film with separate negative and positive units, the cassette can be readily modified to accommodate other types of film, including conventional wet-developing film. Further, while the cassette of the invention preferably has two access openings, it is possible to use only one provided the opaque film envelope is removable through the loading opening. Still further, it is also contemplated that the construction details of the slide rods and cam arrangement can be readily modified. These and various other modifications and alterations of the invention will become apparent to those skilled in the art from the foregoing detailed description and the accompanying drawings. Such modifications are intended to fall within the scope of the appended claims.

It will be appreciated that a further feature of the invention is that the cassette 12 developes a relatively high clamping or gripping force on the film unit while also providing a relatively large clearance between the pressure member and the opposed gripping surface (in radiography, the phosphor layer). The high clamping force is important to obtain good quality prints and the large clearance is important to facilitate the insertion of the film unit and removal of the opaque envelope and the exposed film unit without wrinkling, jamming or scratching the film.

A commonly-assigned application of Herman E. Erikson (our Case No. 5842) for "Apparatus for Positioning Coacting Photographic Sheet Elements" filed concurrently herewith describes a positioning apparatus with which film units exposed in the cassette of this invention can be fed to a standard film processor. That application, the disclosure of which is incorporated herein by reference, shows, for example, in FIG. 3 a mating of film units of the type described hereinabove.

What is claimed is:

1. A substantially thin cassette for holding a photographic light sensitive film unit in a given film plane within the cassette, said cassette comprising:
   spaced apart substantially parallel exterior surfaces defining its thinnest dimensions;
   a film supporting surface within said cassette;
   a substantially planar pressure member extending between and substantially parallel to said exterior surfaces; and
   means for mounting said pressure member for displacement intermediate its said exterior surfaces between a first position wherein said pressure member is spaced apart from said film supporting surface, said spacing between said pressure member and said film supporting surface being sufficient to accomodate the ready insertion or withdrawal of a film unit from therebetween in a plane generally parallel to said exterior surfaces, and a second position wherein said pressure member engages one face of an inserted film unit so as to press the opposite face thereof against said film supporting surface to locate the film unit in the given film plane, said mounting means including two spaced apart slide rods supportively connecting respective edge portions of said pressure member and two spaced apart cam rods fixedly connected with respect to said exterior surfaces, said slide rods and said cam rods having respective complementary configured cam surfaces which cooperate to drive said pressure member into its said first position in response to movement of said slide rods from a first position to a second position, said mounting means also including a resilient biasing element for yieldably urging said pressure member into its said second position in response to the movement of said slide rods into their said first positions, said mounting means additionally including a slide cover disposed for selective actuable sliding movement between first and second positions in a plane between and substantially parallel to one of said exterior surfaces and said pressure member wherein said pressure plate includes at least one cam surface in fixed connection therewith between said slide rods and said slide cover includes at least one cam surface in fixed connection therewith between said slide rods and in opposed complementary relation to said pressure plate cam surface such that selective actuation of said slide cover between its said first and second positions operates to provide a corresponding force urging said pressure plate toward its said second position.

2. The cassette of claim 1 wherein the film unit is of the type suitable for exposure to X-rays and said film supporting surface includes a layer of X-ray sensitive phosphors.

3. The cassette of claim 1 wherein the film unit is of the type having an opaque shield covering its photosensitive layer and wherein said cassette includes a first opening between said parallel exterior surfaces to accommodate the ready insertion and withdrawal of a film unit from said cassette when said pressure member is in its said first position and a second opening between said parallel exterior surfaces opposite to said first opening to accommodate the withdrawal of the shield from an inserted film unit, said first and second openings being configured to cooperate with corresponding opposite ends of an inserted film unit to render said cassette lighttight.

4. The cassette of claim 3 wherein the film unit is of the type which may be inserted into said cassette, trailing end first, through said first opening and which includes a catch at the leading end thereof, and wherein said pressure member includes means complementary to the catch for engaging the catch upon the insertion of the film unit into said cassette and for preventing the film unit from being withdrawn through said second opening when the opaque shield is withdrawn through said second opening.

5. The cassette of claim 4 wherein the catch comprises a pocket like opening adjacent the leading end of the film unit and said complementary catch means includes a tab extending outwardly of said cassette from said pressure member.

6. The cassette of claim 1 wherein the film unit is of the type which may be inserted, trailing end first, into said cassette between said pressure member and said film supporting surface and includes a catch adjacent the leading end thereof and wherein said pressure member includes foldable means complementary to the film unit catch for engaging the catch upon the insertion of the film unit into said cassette, said foldable means and film unit leading end being foldable onto said pressure member and said slide cover being thereafter movable into its said second position overlapping said foldable means, catch and film unit leading end so as to secure the catch and leading end of the film unit between said slide cover and pressure member.

7. The cassette of claim 6 wherein the catch comprises a pocket like opening adjacent the leading end of the film unit and said foldable means includes a foldable tab extending outwardly of said cassette from said pressure member.

8. The cassette of claim 1 wherein said cassette includes an end wall transverse to said slide rods, said end wall including at least two spaced apart openings in general alignment with respective ones of said slide rods to accommodate the movement of said slide rods from their said first positions to their said second positions in response to the insertion of pin members into respective ones of said openings, said mounting means additionally including at least one resilient biasing element for yieldably urging said slide rods into their first positions in response to the withdrawal of the pin members from respective ones of said wall openings.

* * * * *